United States Patent
Harsha et al.

(10) Patent No.: US 12,165,057 B2
(45) Date of Patent: Dec. 10, 2024

(54) SPLIT-NET CONFIGURATION FOR PREDICTIVE MODELING

(71) Applicant: INTERNATIONAL BUSINESS MACHINES CORPORATION, Armonk, NY (US)

(72) Inventors: Pavithra Harsha, White Plains, NY (US); Brian Leo Quanz, Yorktown Heights, NY (US); Shivaram Subramanian, Frisco, TX (US); Wei Sun, Tarrytown, NY (US); Max Biggs, Charlottesville, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 910 days.

(21) Appl. No.: 17/135,925

(22) Filed: Dec. 28, 2020

(65) Prior Publication Data

US 2022/0207347 A1    Jun. 30, 2022

(51) Int. Cl.
*G06N 3/08* (2023.01)
*G06F 18/25* (2023.01)
*G06N 20/20* (2019.01)

(52) U.S. Cl.
CPC ............. *G06N 3/08* (2013.01); *G06F 18/251* (2023.01); *G06N 20/20* (2019.01)

(58) Field of Classification Search
CPC .......... G06N 3/08; G06N 20/20; G06N 3/045; G06N 5/01; G06F 18/251; G06F 18/24133; G06V 10/778; G06V 10/82
See application file for complete search history.

(56) References Cited

U.S. PATENT DOCUMENTS

| | | | |
|---|---|---|---|
| 5,002,313 | A | 3/1991 | Salvatore |
| 7,072,852 | B1 | 7/2006 | Kamille |
| 7,451,123 | B2 | 11/2008 | Platt et al. |
| 8,280,768 | B2 | 10/2012 | Davis |
| 9,965,770 | B2 | 5/2018 | Mason-Gugenheim et al. |
| 11,281,969 | B1 * | 3/2022 | Rangapuram ............ G06N 7/01 |

(Continued)

OTHER PUBLICATIONS

Cheng, H. T., Koc, L., Harmsen, J., Shaked, T., Chandra, T., Aradhye, H., . . . & Shah, H. (2016, September). Wide & deep learning for recommender systems. In Proceedings of the 1st workshop on deep learning for recommender systems (pp. 7-10). (Year: 2016).*

(Continued)

*Primary Examiner* — KC Chen
(74) *Attorney, Agent, or Firm* — Intelletek Law Group, PLLC; Gabriel Daniel, Esq.

(57) ABSTRACT

A machine learning system that uses a split net configuration to incorporate arbitrary constraints receives a set of input data and a set of functional constraints. The machine learning system jointly optimizes a deep learning model by using the set of input data and a wide learning model by using the set of constraints. The deep learning model includes an input layer, an output layer, and an intermediate layer between the input layer and the output layer. The wide learning model includes an input layer and an output layer but no intermediate layer. The machine learning system provides a machine learning model comprising the optimized deep learning model and the optimized wide learning model.

20 Claims, 4 Drawing Sheets

(56) References Cited

U.S. PATENT DOCUMENTS

| | | | |
|---|---|---|---|
| 2006/0224533 A1* | 10/2006 | Thaler | G06N 3/105 706/15 |
| 2012/0158474 A1 | 6/2012 | Fahner et al. | |
| 2012/0330867 A1 | 12/2012 | Gemulla et al. | |
| 2013/0006738 A1 | 1/2013 | Horvitz et al. | |
| 2013/0006744 A1 | 1/2013 | Redford et al. | |
| 2013/0006750 A1 | 1/2013 | Simmons, Jr. | |
| 2013/0024261 A1 | 1/2013 | Main et al. | |
| 2013/0041737 A1 | 2/2013 | Mishra et al. | |
| 2013/0073372 A1 | 3/2013 | Novick et al. | |
| 2015/0100402 A1 | 4/2015 | Gadotti | |
| 2015/0205759 A1 | 7/2015 | Israel et al. | |
| 2017/0011416 A1 | 1/2017 | Vaysman | |
| 2017/0300814 A1* | 10/2017 | Shaked | G06N 3/047 |
| 2018/0107925 A1 | 4/2018 | Choi et al. | |
| 2019/0171908 A1 | 6/2019 | Salavon | |
| 2019/0172082 A1* | 6/2019 | Ganti Mahapatruni | G06N 5/01 |
| 2019/0180303 A1 | 6/2019 | Ventrice et al. | |
| 2020/0026996 A1 | 1/2020 | Kolter et al. | |
| 2020/0234374 A1 | 7/2020 | Bawadhankar et al. | |
| 2023/0154055 A1 | 5/2023 | Besenbruch et al. | |

OTHER PUBLICATIONS

Bedi, J. et al., "Deep Learning Framework to Forecast Electricity Demand"; Applied Energy (2019); vol. 238; pp. 1312-1326.

Carbonneau, R. et al., "Application of Machine Learning Techniques for Supply Chain Demand Forecasting"; European Journal of Operational Research (2008); vol. 184; pp. 1140-1154.

Ke, J. et al., "Short-Term Forecasting of Passenger Demand under On-Demand Ride Services: A Spatio-Temporal Deep Learning Approach"; arXiv:1706.06279v1 [cs.LG] (2017); 39 pgs.

Qiu, X. et al., "Empirical Mode Decomposition based Ensemble Deep Learning for Load Demand Time Series Forecasting"; Applied Soft Computing (2017); 40 pgs.

Yao, H. et al., "Deep Multi-View Spatial-Temporal Network for Taxi Demand Prediction"; The Thirty-Second AAAI Conference on Artificial Intelligence (2018); pp. 2588-2595.

List of IBM Patents or Patent Applications Treated as Related, 2 pgs.

Kilroy, J. et al., "Method and System for Exchanging and Trading Online Coupons"; IP.Com (2011); 4 pgs.

* cited by examiner

SPLIT-NET CONFIGURATION FOR PREDICTIVE MODELING

BACKGROUND

Technical Field

The present disclosure generally relates to predictive modeling.

Description of the Related Arts

Deep Learning, or DL, is a multi-layer neural network and associated with technology in Artificial Intelligence (AI), enabling many new and improved applications dominating research and applications in recent years. Deep Learning enables flexible modeling that models arbitrary underlying processes more accurately than traditional methods. Deep Learning has enabled obtaining state-of-the-art results for a variety of predictive tasks and applications in many domains (e.g., image classification, text classification, language modeling, translation, game playing through reinforcement learning beating world champions, etc.) with less effort to design models and features.

In recent years, deep learning is also being used more frequently in applications for predictive modeling to drive processes and systems, as more and more data becomes available and desired to be included in predictive modeling to drive an industry process. Nevertheless, many obstacles remain when applying DL to real industry problems and industry behaviors involving constraints specific to different industry domains. For example, in demand planning, price is a key factor for predicting demand, and there are known relationships such as that increased price leads to decreased demand. The price-demand relationship need to be captured directly to manage multiple processes and systems such as predicting demand for different prices. On the other hand, in service workforce management, there are known relationships such as adding more workers reduces the risks of work ticker violation, having more skilled workers reduces number of workplace incidents, etc.

The chief difficulty in applying DL to industry problems is that there is no way to enforce known industry constraints in the deep learning modeling and there is not enough available data to accurately learn the known behavior. Such functional constraints specific to a domain cannot be directly incorporated into DL models because DL models work by constraining neural nets, which have complex functional forms and derivatives. Incorporating domain-specific constraints may lead to a learning problem too inefficient and difficult to optimize DL models that are more powerful and accurate often do not respect industry constraints and generalize incorrectly, leading to poor, bizarre, and incorrect decisions. Consequently, applications often make do with weaker, less accurate models for which the constraints can be incorporated.

SUMMARY

Some embodiments of the disclosure provide a machine learning system that uses a split net configuration to incorporate arbitrary constraints. The machine learning system receives a set of input data and a set of functional constraints. The machine learning system jointly optimizing a deep learning model by using the set of input data and a wide learning model by using the set of constraints. The deep learning model includes an input layer, an output layer, and an intermediate layer between the input layer and the output layer. The wide learning model includes an input layer and an output layer but no intermediate layer. The machine learning system provides a machine learning model comprising the optimized deep learning model and the optimized wide learning model.

In some embodiments, the wide learning model is a constrained parametric model. In some embodiments, both the deep learning model and the wide learning mode are different components of a same machine learning model that may share input or output units/nodes/neurons. In some embodiments, deep learning model is a unconstrained non-parametric model. The set of functional constraints is not used to optimize the deep learning model.

In some embodiments in which the split-net configuration is used to optimize the machine learning model for price demand response, the set of input data used to optimize the deep learning model includes data that are independent of pricing changes, and the deep learning model is trained to learn fixed features of a domain. The set of functional constraints used in optimizing the wide learning model includes constraints based on pricing changes, and the wide learning model is constrained for memorization of demand response (relative to price).

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

By including a wide learning model alongside a deep learning model in a machine learning model, arbitrary functional constraints can be efficiently implemented in the machine learning model such that fixed features can be efficiently learned by the deep learning model while the functional constraints such as price demand relationship can be learned by the wide learning model. More automatic, accurate, scalable and efficient predictive modeling system that generalizes correctly to unseen data, to drive downstream industry systems and processes is therefore realized.

BRIEF DESCRIPTION OF THE DRAWINGS

The drawings are of illustrative embodiments. They do not illustrate all embodiments.

Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

When implementing arbitrary constraints in machine learning, typically, traditional, "weaker" approaches that use simple parametric (e.g., generalized linear) model are used so constraints can be easily incorporated in learning with a modified formulation/optimization problem that can be easily solved. With linear models, many of the industry constraints often amount to simple linear constraints on the parameters so they can be efficiently learned as part of a convex or efficiently solvable non-convex optimization problem. The challenge is to implement arbitrary constraints in deep learning (DL) models so to be able to take advantage of its ability to learn complex functions from many variables but not be restricted to a fixed parametric form which may be unrealistic and do not match the underlying data.

DL functions are highly non-linear and non-convex, which includes a chain of non-linear transformations. Similarly, the derivative of a neural net model with respect to any input is also a deeply nested, highly non-linear/no convex function. Consequently, directly applying constraints to DL as with simple models is very difficult if not impossible. On the other hand, in real life industry applications, constraints to capture multiple assumed behaviors are getting more and more complicated and varied such as when there are multiple different functional constraints.

For industry applications involving purchasing and pricing, traditional DL models are known to be effective at estimating baseline (e.g., fixed price) purchase propensities. However, DL models are not able to predict demand responses accurately when price variation is limited in the data, and often generate responses to price changes (or price elasticity) that are inaccurate and non-interpretable.

In some embodiments, a machine learning model in a split-net configuration is used to provide the set of learning transforms to implement the set of arbitrary constraints (e.g., industry constraints such as the selected domain-specific constraints and general functional relationships) in a machine learning model. Split-net is a configuration or construct in which parts of the machine learning model (or neural network) is designated to use a simpler model and the parameters of that simpler model is constrained to match the arbitrary constraint. In some embodiments, the machine learning model includes a wide learning model (WL component) having no intermediate learning layer in addition to a deep learning model (DL component) having one or more intermediate layers. The WL component is trained jointly with the DL component, i.e., the DL and WL components are optimized at the same time and over the same objective or loss function.

In some embodiments, the DL component is unconstrained (non-parametric) with regard to the arbitrary constraints while the WL component is constrained (parametric) according to the arbitrary constraints. In some embodiments, the WL component performs linear generalization while the DL component performs non-linear generalization. In some embodiments, the set of arbitrary constraints is used to identify which input elements in the network are to be split. Those input elements are directly translated to optimization constraints based on the associated parameters. The DL component of the split-net model is unconstrained for generalization across purchase context. The DL component captures complex relationships among fixed/known features of the purchase domain. Assortment-level price inputs (min/max/avg) can also be entered into the DL component. The WL component is constrained for memorization of demand responses and other well-studied and interpretable customer responses to pricing.

For industry applications involving predicting purchasing behaviors based on pricing, such a jointly trained model is shown to yield high predictive accuracy over a wide price range. Consistency of resulting price elasticity is ensured via constrained training. A split network approach exploits the latent structure of the correlations to reduce the dimensionality of search and storage requirements significantly and thereby identifies the most profitable set of feasible prices, typically in less than 10 milliseconds for large practical problem instances.

When pricing multiple price-sensitive products whose demands are correlated (e.g., all 34-inch wide-screen computer monitors sold by a retailer that are substitutable), a pure constrained DL method may not be scalable. Furthermore, the relative prices between some product-brands are constrained by a variety of business rules (e.g., flat-screen monitor cheaper than curved monitor for the same brand). Given N correlated products each having M price points to choose from, $M^N$(or M^N) combinations are typically evaluated using DL in order to find the best feasible price combination for the products. On the other hand, split-net can achieve a significant reduction in the number of pricing weights required by the neural network, from $O(N^2)$ or more to $O(N)$. A split-net system therefore has less data to calibrate, and has reduced storage requirement even when N is large and the seller offers thousands of such different products in their ecommerce channel.

Figure 1:
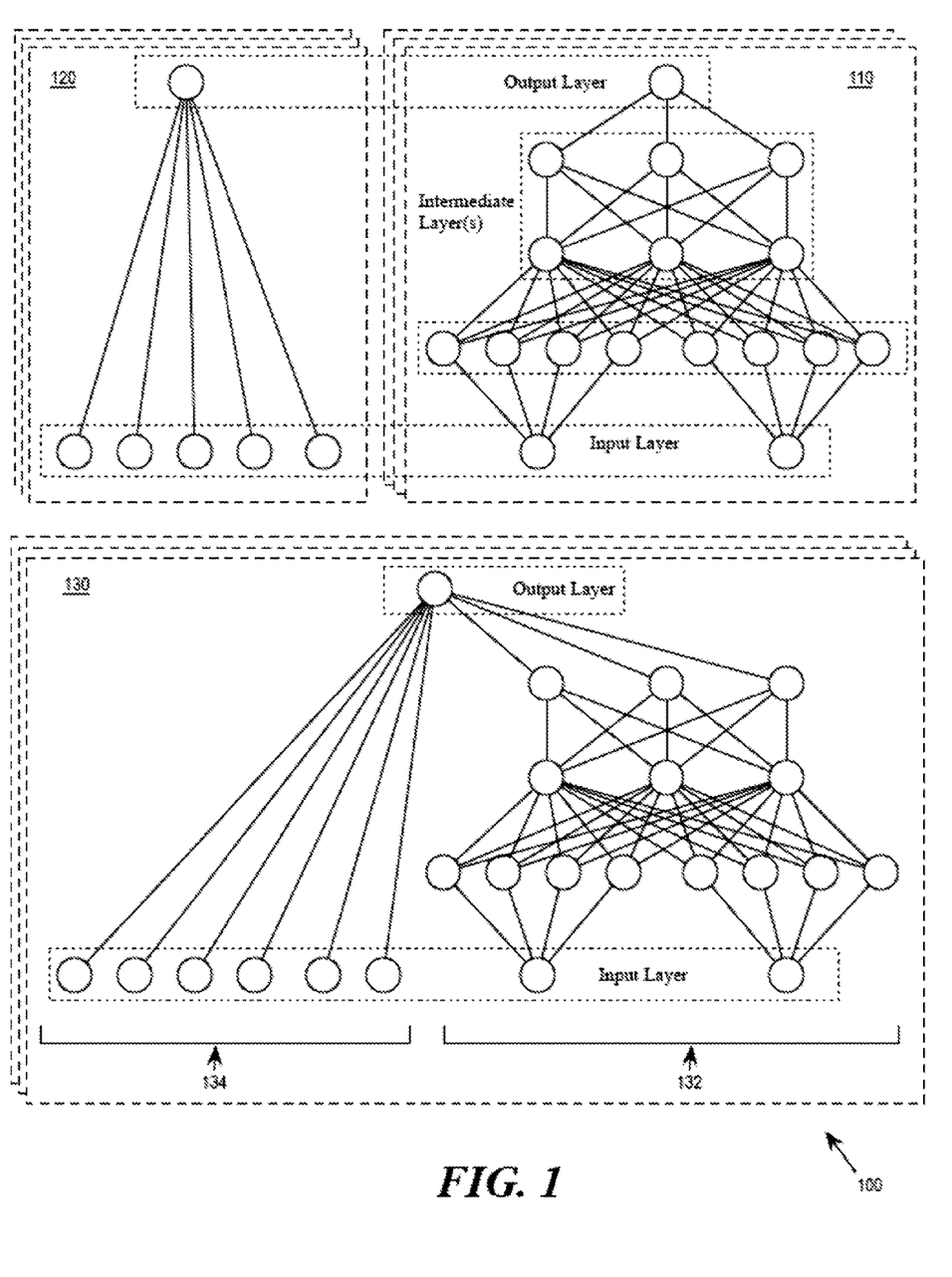
FIG. 1 conceptually illustrates a machine learning model that may support split net configuration, consistent with an illustrative embodiment.

FIG. 1 conceptually illustrates a machine learning model that may support a split net configuration, consistent with an illustrative embodiment. As illustrated, a machine learning model 100 may have one or more DL networks 110, one or more WL networks 120, and one or more mixed DL-WL networks 130. A DL network 110 has nodes or neurons in an input layer, an output layer, and one or more intermediate layers (e.g., hidden layers and dense embeddings). A WL network 120 has nodes or neurons in only input and output layers but not intermediate layers. A mixed DL-WL network 130 has a DL component 132 and a WL component 134. The DL component 132 has input, output, and intermediate layers. The WL component 134 has input and output layers without intermediate layers. The DL and WL components 132 and 134 may have common input and/or output.

Figure 2:
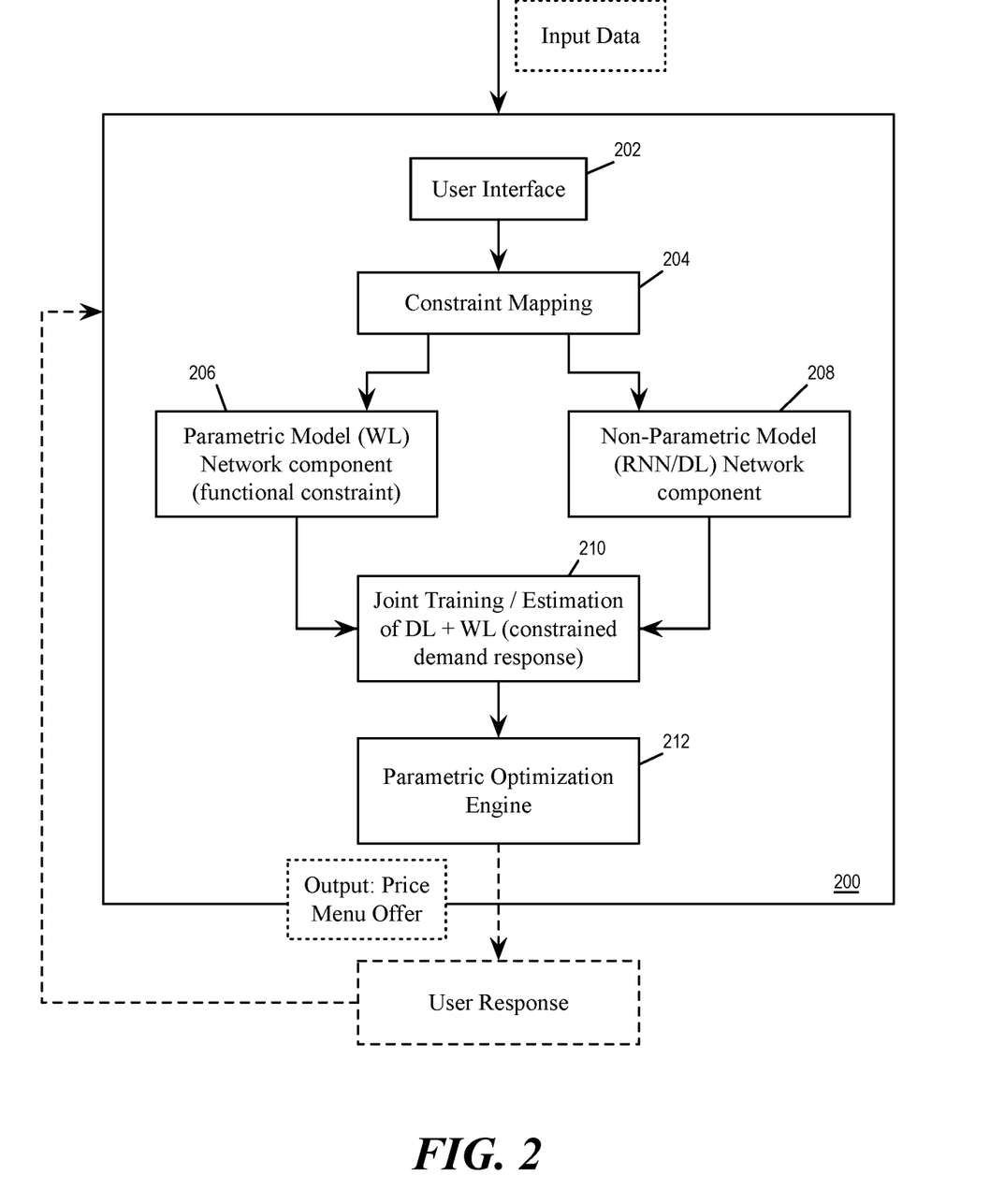
FIG. 2 illustrates a machine learning system implementing a machine learning model in split net configuration.

FIG. 2 illustrates a machine learning system 200 implementing a machine learning model in split net configuration (e.g., the machine learning model 100). The system 200 includes a user interface module 202, a constraint mapping module 204, a non-parametric (DL) model 206, a parametric (WL) model 208, a joint training module 210, and a parametric optimization engine 212. In some embodiments, a computing system of one or more computing devices implement the machine learning system 200. In some embodiments, the modules 202, 204, 206, 208, 210, and 212 are modules of software instructions being executed by one or more processing units (e.g., a processor) of the computing devices. In some embodiments, the modules 202-212 are modules of hardware circuits implemented by one or more integrated circuits (ICs) of an electronic apparatus. Though the modules 202-212 are illustrated as being separate modules, some of the modules can be combined into a single module. For example, the functionalities of the joint training module 210 and the parametric optimization engine 212 can be merged into one optimization module. An example computing device 400 that may implement the machine learning system 200 will be described by reference to FIG. 4 below.

The machine learning system 200 may implement the machine learning model 100, such that the non-parametric model (DL) module 206 implements the DL network 110 or the DL component 132, and the parametric model (WL) module 208 implements the WL network 120 or the WL component 134.

The user interface module 202 lets users add or adjust arbitrary constraints, including functional constraints and/or relationships. In some embodiments, the user interface module 402 allows the selection of a set of domain-specific constraints from multiple different sets of domain-specific constraints (e.g., industry types), of a set of general functional relationships from multiple sets of general functional relationships. A set of domain-specific constraints can be constraints that are known to be common to a type of industry (e.g., demand should not increase if price increases). A general functional relationship specifies the mathematical or logical relationship between variables. These constraints are "general" as they may be applicable to any number of industry domains.

The user interface module 202 may provide a list of possible domains (e.g., demand planning industry, healthcare industry, workforce management industry, etc.) and a list of general functional relationships (e.g., gradient constraints, convex/concave relationships, steady state behavior, modality constraints, multi-variable relationship constraints, etc.) for the user to choose from. The user interface module 202 may also provide a list of industries for the user to choose from, and the user interface module 202 may then in turn translate the chosen industry into selections of domain-specific constraints and general functional relationships. The user interface module 202 may also allow user to build new patterns by selecting variables and classes of relation components (domain-specific constraints and general functional relationships) or specifying parameters that are particular to the user's application. The user interface may also receive different types of input data for training the non-parametric DL model 206 and the parametric WL model 208.

The constraint mapping module 204 maps the arbitrary constraints to constructs of the machine learning model. For example, the constraint mapping module 204 may determine the configurations of the non-parametric DL model 206 and the parametric WL model 208 based on the arbitrary constraints, and which variables of the input data are mapped as inputs/outputs of the non-parametric DL model 206 or the parametric WL model 208. For example, for a purchase application, data input such as customer data, purchase history, price, inventory availability may be used to train one or both of the DL and WL models 206 and 208. The non-parametric DL model 206 is trained based on multi-year data, which may include customer, assortment, and purchase history. The WL parametric model 208 is trained for learning demand responses based on own/cross price elasticity estimation, including pricing contextual data and functional data on prices, market segments, and other constraint parameters. More generally, the WL parametric model 208 can be trained to implement functional constraints such as monotone demand response. The non-parametric DL model 206 and the parametric WL model 208 are jointly trained (at the same time and over a same cost function) by the joint training module 210 to produce a joint estimation of the DL and the WL (constrained demand response). The joint estimate can in turn be used by the parametric optimization engine 212 to output an optimal price menu based on availability. The user may use the price menu further generate additional data to be used as input for training the parametric WL model 208, forming a demand response learning loop.

Figure 3:
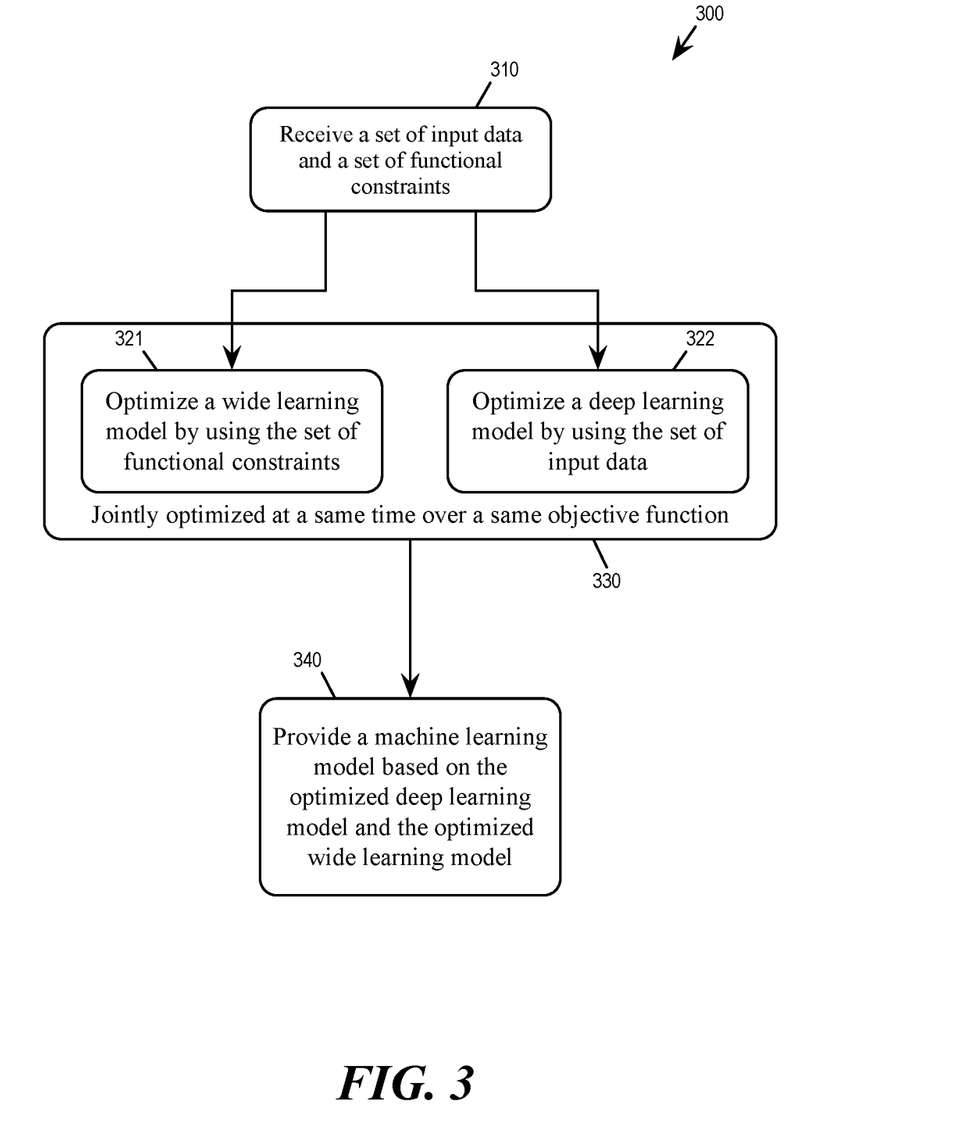
FIG. 3 conceptually illustrates a process for implementing arbitrary constraints at a machine learning model in split-net configuration, consistent with an illustrative embodiment.

FIG. 3 conceptually illustrates a process 300 for implementing arbitrary constraints at a machine learning model in split-net configuration, consistent with an illustrative embodiment. In some embodiments, one or more processing units (e.g., processor) of a computing device implementing the machine learning system 200 perform the process 300 by executing instructions stored in a computer readable medium.

The machine learning system receives (at block 310) a set of input data and a set of functional constraints for training a machine learning model that includes a deep learning model and a wide learning model. The deep learning model includes an input layer, an output layer, and an intermediate layer between the input layer and the output layer. The wide learning model includes an input layer and an output layer but no intermediate layer. In some embodiments, the wide learning model is a constrained parametric model. In some embodiments, both the deep learning model and the wide learning mode are different components of a same machine learning model that may share input or output units/nodes/neurons.

The machine learning system optimizes (at block 321) a deep learning model by using the set of input data. In some embodiments, deep learning model is an unconstrained non-parametric model. The set of functional constraints is not used to optimize the deep learning model. The machine learning system also optimizes (at block 322) a wide learning model by using the set of constraints. In some embodiments, the wide learning model and the deep learning model are jointly optimized (at 330) at a same time and over a same objective function. (In other words, the optimization operations of the block 321 and the optimization operations of the block 322 are performed jointly).

The machine learning system provides (at block 340) a machine learning model that includes the optimized deep learning model and the optimized wide learning model. In some embodiments in which the split-net configuration is used to optimize the machine learning model for price demand response, the set of input data used to optimize the deep learning model includes data that are independent of pricing changes, and the deep learning model is trained to learn fixed features of a domain. The set of functional constraints used in optimizing the wide learning model includes constraints based on pricing changes, and the wide learning model is constrained for memorization of demand response (relative to price).

The present application may be a system, a method, and/or a computer program product at any possible technical detail level of integration. The computer program product may include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 3) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
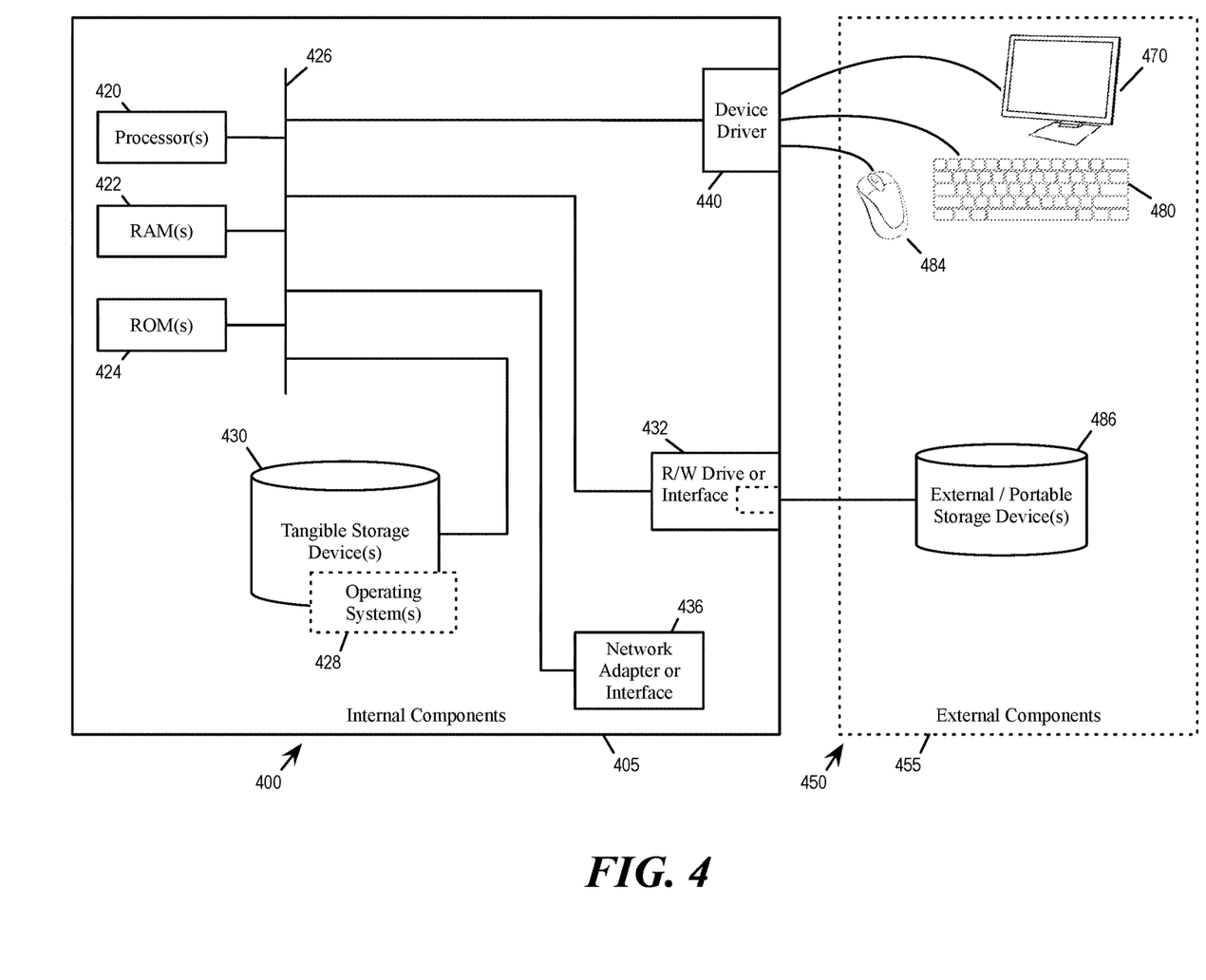
FIG. 4 shows a block diagram of the components of a data processing system in accordance with an illustrative embodiment of the present disclosure.

FIG. 4 shows a block diagram of the components of data processing systems 400 and 450 that may be used to implement a machine learning system in accordance with an illustrative embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

Data processing systems 400 and 450 are representative of any electronic device capable of executing machine-readable program instructions. Data processing systems 400 and 450 may be representative of a smart phone, a computer system, PDA, or other electronic devices. Examples of computing systems, environments, and/or configurations that may represented by data processing systems 400 and 450 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 400 and 450 may include a set of internal components 405 and a set of external components 455 illustrated in FIG. 4. The set of internal components 405 includes one or more processors 420, one or more computer-readable RAMs 422 and one or more computer-readable ROMs 424 on one or more buses 426, and one or more operating systems 428 and one or more computer-readable tangible storage devices 430. The one or more operating systems 428 and programs such as the programs for executing the process 300 are stored on one or more computer-readable tangible storage devices 430 for execution by one or more processors 420 via one or more RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

The set of internal components 405 also includes a R/W drive or interface 432 to read from and write to one or more portable computer-readable tangible storage devices 486 such as a CD-ROM, DVD, memory stick, magnetic tape, magnetic disk, optical disk or semiconductor storage device. The instructions for executing the process 300 can be stored on one or more of the respective portable computer-readable tangible storage devices 486, read via the respective R/W drive or interface 432 and loaded into the respective hard drive 430.

The set of internal components 405 may also include network adapters (or switch port cards) or interfaces 436 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 436. From the network adapters (or switch port adaptors) or interfaces 436, the instructions and data of the described programs or processes are loaded into the respective hard drive 430. The network may comprise copper wires, optical fibers, wireless transmission, routers, firewalls, switches, gateway computers and/or edge servers.

The set of external components 455 can include a computer display monitor 470, a keyboard 480, and a computer mouse 484. The set of external components 455 can also include touch screens, virtual keyboards, touch pads, pointing devices, and other human interface devices. The set of internal components 405 also includes device drivers 440 to interface to computer display monitor 470, keyboard 480 and computer mouse 484. The device drivers 440, R/W drive or interface 432 and network adapter or interface 436 comprise hardware and software (stored in storage device 430 and/or ROM 424).

The foregoing one or more embodiments implements a machine learning system by having one or more computing devices storing and/or a machine learning model that includes both a deep learning component and a wide learning component. The computer infrastructure is further used to jointly optimize the deep learning component and the wide learning component of the machine learning model.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:
receiving a set of input data and a set of functional constraints, wherein the set of functional constraints is received based on user selections from a user interface;
jointly optimizing a deep learning model by using the set of input data and a wide learning model by using the set of functional constraints mapped to constructs of a machine learning model comprising the deep learning model and the wide learning model, wherein:
the deep learning model comprises an input layer, an output layer, and an intermediate layer between the input layer and the output layer, and
the wide learning model comprises an input layer and an output layer but no intermediate layer; and
providing the machine learning model comprising the optimized deep learning model and the optimized wide learning model.

2. The computing device of claim 1, wherein the deep learning model and the wide learning model are jointly trained at a same time and over a same objective function.

3. The computing device of claim 1, wherein:
the deep learning model is an unconstrained non-parametric model, and
the wide learning model is a constrained parametric model.

4. The computing device of claim 1, wherein the set of functional constraints is not used to optimize the deep learning model.

5. The computing device of claim 1, wherein the set of input data used to optimize the deep learning model comprises data that is independent of pricing changes.

6. The computing device of claim 1, wherein the set of functional constraints used in optimizing the wide learning model comprises one or more constraints based on pricing changes.

7. The computing device of claim 1, wherein the wide learning model is constrained for memorization of a demand response relative to a price.

8. The computing device of claim 1, wherein the deep learning model is trained to learn fixed features of a domain.

9. The computing device of claim 1, wherein the set of input data comprises a plurality of prices for each of a plurality of correlated products.

10. A computer-implemented method comprising:
receiving a set of input data and a set of functional constraints, wherein the set of functional constraints is received based on user selections from a user interface;
jointly optimizing a deep learning model by using the set of input data and a wide learning model by using the set of constraints mapped to constructs of a machine learning model comprising the deep learning model and the wide learning model, wherein:
the deep learning model comprises an input layer, an output layer, and an intermediate layer between the input layer and the output layer,
the wide learning model comprises an input layer and an output layer but no intermediate layer; and providing the machine learning model comprising the optimized deep learning model and the optimized wide learning model.

11. The computer-implemented method of claim 10, wherein the deep learning model and the wide learning model are jointly trained at a same time and over a same objective function.

12. The computer-implemented method of claim 10, wherein:
the deep learning model is an unconstrained non-parametric model, and
the wide learning model is a constrained parametric model.

13. The computer-implemented method of claim 10, wherein:
the set of functional constraints is not used to optimize the deep learning model, and
the set of input data used to optimize the deep learning model comprises data that is independent of pricing changes.

14. The computer-implemented method of claim 10, wherein the set of functional constraints used in optimizing the wide learning model comprises one or more constraints based on pricing changes.

15. The computer-implemented method of claim 10, wherein the wide learning model is constrained for memorization of a demand response relative to a price.

16. The computer-implemented method of claim 10, wherein the deep learning model is trained to learn fixed features of a domain.

17. A computer program product comprising:
one or more non-transitory computer-readable storage devices and program instructions stored on at least one of the one or more non-transitory storage devices, the program instructions executable by a processor, the program instructions comprising sets of instructions for:
receiving a set of input data and a set of functional constraints, wherein the set of functional constraints is received based on user selections from a user interface;
jointly optimizing a deep learning model by using the set of input data and a wide learning model by using the set of constraints mapped to constructs of a machine learning model comprising the deep learning model and the wide learning model, wherein:
the deep learning model comprises an input layer, an output layer, and an intermediate layer between the input layer and the output layer, and
the wide learning model comprises an input layer and an output layer but no intermediate layer; and providing the machine learning model comprising the optimized deep learning model and the optimized wide learning model.

18. The computer program product of claim 17, wherein the set of functional constraints is not used to optimize the deep learning model.

19. The computer program product of claim 17, wherein:
the set of input data used to optimize the deep learning model comprises data that is independent of pricing changes, and
the set of functional constraints used in optimizing the wide learning model comprises constraints based on pricing changes.

20. The computer program product of claim 17, wherein:
the wide learning model is constrained for a memorization of a demand response relative to a price, and
the deep learning model is trained to learn fixed features of a domain.

* * * * *